(12) United States Patent
Chen et al.

(10) Patent No.: US 11,165,645 B2
(45) Date of Patent: *Nov. 2, 2021

(54) MESSAGE QUEUE MIGRATION ON A/B RELEASE ENVIRONMENTS

(71) Applicant: Citrix Systems, Inc., Fort Lauderdale, FL (US)

(72) Inventors: Yongyu Chen, Nanjing (CN); Pengcheng Zhang, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/857,451

(22) Filed: Apr. 24, 2020

(65) Prior Publication Data

US 2020/0252268 A1 Aug. 6, 2020

Related U.S. Application Data

(63) Continuation of application No. 15/886,985, filed on Feb. 2, 2018, now Pat. No. 10,637,730.

(51) Int. Cl.
| | |
|---|---|
| *G06F 15/167* | (2006.01) |
| *H04L 12/24* | (2006.01) |
| *H04L 29/08* | (2006.01) |
| *H04L 12/861* | (2013.01) |

(52) U.S. Cl.
CPC ........ *H04L 41/082* (2013.01); *H04L 41/0893* (2013.01); *H04L 49/90* (2013.01); *H04L 67/2842* (2013.01)

(58) Field of Classification Search
USPC .......................... 709/213, 201, 202, 231, 230
See application file for complete search history.

(56) References Cited

U.S. PATENT DOCUMENTS

2018/0336129 A1\* 11/2018 Hutchison ........... G06F 12/0246

OTHER PUBLICATIONS

Non-Final Office Action for U.S. Appl. No. 15/886,985, dated Sep. 6, 2019.
Notice of Allowance for U.S. Appl. No. 15/886,985, dated Dec. 27, 2019.
Notice of Allowance for U.S. Appl. No. 15/886,985, dated Mar. 2, 2020.

\* cited by examiner

*Primary Examiner* — Lan Dai T Truong
(74) *Attorney, Agent, or Firm* — Foley & Lardner LLP

(57) ABSTRACT

Described embodiments provide systems and methods of maintaining message queues during deployments of application updates. A queue manager may maintain a first message queue including a first channel for messages between a first release and a second release. The first release and the second release may write to and read from the first message queue. The queue manager may establish, responsive to deployments, a second message queue including a second channel for messages between the first release and the second release. The queue manager may transfer, from the first message queue to the second message queue, the first channel. The first release and the second release may cease to write to and read from the first message queue.

20 Claims, 6 Drawing Sheets

Prior to Any Deployments

First Deployment

MESSAGE QUEUE MIGRATION ON A/B RELEASE ENVIRONMENTS

CROSS-REFERENCE TO RELATED APPLICATION

This patent application is a continuation of, and claims priority to and the benefit of U.S. patent application Ser. No. 15/886,985, titled "MESSAGE QUEUE MIGRATION ON A/B RELEASE ENVIRONMENTS," and filed Feb. 2, 2018, the contents of all of which are hereby incorporated herein by reference in its entirety for all purposes.

FIELD OF THE DISCLOSURE

The present application generally relates to deploying application updates. In particular, the present application relates to systems and methods for maintaining message queues during deployments of application updates.

BACKGROUND

The performance of an application update may be measured by running a controlled experiment. In the experiment, a control set of clients may execute a control version of the application and a variable set of clients may execute an alternate version of the application. During the testing of the different versions of the application, runtime measurement data may be cached from each of the clients and messages may be exchanged between the two sets of clients. Degradation and loss of data consistency in the stored data and messages may arise when attempting to deploy the updates to the two sets of clients.

BRIEF SUMMARY

The present disclosure is directed towards systems and methods for maintaining message queues during deployments of application updates. To measure and compare the performance of various versions of an application, a deployment instrumentation service may perform a two-sample hypothesis testing (also referred to as A/B testing, bucket testing, or split-run testing). In one experiment setup, the service may provide a control version of the application to a control release group of clients to execute and may provide a variable version of the application a variable release group of clients to execute. During testing, each release group of clients may write runtime data onto a cache at the deployment instrumentation service. Furthermore, in certain circumstances, one release group may exchange messages with the other release group via a message queue maintained by the service. The runtime data and messages may be written onto and read from storage of the service in accordance to a set of data validation rules. The data validation rules may include database constraints, cascades, and/or triggers. The database constraints may specify relations between entries. The cascades may include protocols for performing a rollback on the data on storage at the service. The triggers may include protocols for performing various functions in response to pre-specified event.

When deploying one version of the application to one of the release groups in a switch fabric release, data consistency in the runtime data in the cache and the messages in the message queue may deteriorate. The loss in data consistency may arise from differences in how the data is generated between the various versions of the application data. Existing techniques of addressing the degradation or loss in data consistency of data stored in the system may depend on the amount of data to be changed between the two versions of applications. The time to deploy subsequent version may therefore vary based on the degree of the difference between various versions of the application. In such setups, all the data from multiple deployments may be maintained on one storage. As such, there may be obsolete data from older deployments in storage. Moreover, even with such techniques, data consistency in the messages stored in the queue may not be fully preserved, potentially resulting in messages being written or read by one release group out of order or the same messages being written or read multiple times during switch fabric releases. The reading of a message multiple times by either release group may result in service errors. In addition, with each additional deployment, there may be not enough storage to handle the increasing amount of runtime data stored in the caches and messages in the message queue.

To maintain stability and to resolve degradation and/or loss in data consistency in the stored data and messages, the present systems and methods provide a migration plan of messages for application update deployments in a two-sample hypothesis testing environment. With the migration plan, not only may data consistency be preserved but also messages may be continuously communicated between the release groups during the application update deployment in a forward and a backward direction. Prior to any deployment, a first message queue may have been established with two communication channels to exchange messages between a first release group (e.g., the variable group) and a second release group (e.g., the control group). There may be a first communication channel for messages traveling from the first release group to the second release group and a second communication channel for messages traveling from the second release group to the first release group. Initially, both the first release group and the second release group may write to and read from the first message queue. With subsequent deployments of the application updates, the service may continue to monitor runtime data from each of the release groups. In addition, the service may transfer or migrate the two communication channels from the initial message queue to another message queue in the manner detailed below.

With a first deployment of the application update, a queue manager of the service may initialize a second message queue. The first release group may read from the second message queue, while also writing to and reading from the first message queue. In the meanwhile, the second release group may continue to write to and read from the first message queue. In this manner, the first release group and the second release group may continue to exchange messages via the two communication channels through the first message queue.

Upon completion of the first deployment, the service may commence with the second deployment of the application update. The second release group may be set to discontinue or cease writing to the first message queue and instead write to the second message queue. As the first release group continues to write to the first message queue and the second release is now reading from the first message queue, messages may flow from the first release group via the first communication channel through the first message queue to the second release group. Furthermore, as the second release group now writes to the second message queue and the first release group continues to read from the first message queue, messages may flow from the second release group via the second communication channel through the second message queue to the first release group. In this manner, the communication channel through the first message queue may continue to be operational.

When the second deployment has finished, the service may start with the third deployment of the application update. At this point, the first release group may be set by the queue manager to stop writing to the first messaging group. As a result, no new messages may be written onto the first message queue from either the first release group or the second release group. The first release group and the second release group may continue to read from the first message queue, as old messages may still be stored on the first message queue. Additionally, the first release group and the second release group now both write to the second message queue. New messages from the first release group and the second release group may be exchanged via the second message queue. As such, now both the first communication channel and the second communication channel may be both through the second message queue.

After the third deployment of the application update, the service may initiate a fourth deployment of the application update. The queue manager may determine whether messages from the first release group stored in the first message queue have expired. If the messages have expired, the second release group may be set to cease reading from the first message queue. The first release group may continue to read from the first message queue. As before, both the first release group and the second release group may continue to write to and read from the second message queue. All new messages thus from the first release group or the second release group may be exchanged through the communication channels of the second message queue.

With the end of the fourth deployment of the application update, the service may begin a fifth deployment of the application update. The queue manager may determine whether messages from the second release group stored in the first message queue have expired. If the messages have expired, the first release group may be set to cease reading from the first message queue. At this stage, both the first release group and the second release group may continue to write to and read from the second message queue. With the messages from either the first release group or the second release group in the first message queue all expired, the queue manager may remove or delete the first message queue.

In this manner, the migration of the communication channels from one message queue to another message queue may be complete. Since writing or reading by each release group is changed at each deployment, data consistency in the cached runtime data may be maintained across the multiple deployments. In addition, as the communication channels are transferred from one queue to another, messages may be continuously communicated between the two release groups during the application update deployment in a forward and a backward direction.

Stated differently, the present disclosure describes a system that can exhibit a Redis™ migration plan for AB canary releases. The migration plan can maintain data consistency when migrating between two Redis™ message queues and caches. Also, to ensure that there are no system errors, the system may keep and maintain only one active communication channel in one of the Redis™ message queues in a forward direction and a backward direction respectively during the duration of the migration.

At least one aspect of this disclosure is directed to a method of maintaining message queues during deployments of application updates. A queue manager executing on one or more processors may maintain a first message queue including a first communication channel for storing one or more messages exchanged between a first release and a second release. The first release may write to and read from the first message queue. The second release may write to and read from the first message queue. One or more application updates may be deployed to one of the first release and the second release. The queue manager may establish, responsive to deploying the one or more application updates, a second message queue including a second communication channel for storing one or more messages exchanged between the first release and the second release. The first release may continue to write to and read from the first message queue and read from the second message queue. The second release may read from the first message queue and cease writing to the first message queue. The second release may write to and read from the second message queue. The queue manager may transfer the first communication channel from the first message queue to the second message queue. The first release may cease writing to and reading from the first message queue. The second release may cease reading from the first message queue.

In some embodiments, the queue manager may determine that a deployment of an application update of the one or more application updates to one of the first release or the second release is to commence. In some embodiments, establishing the second message queue may include establishing the second message queue responsive to determining that deployment of the application update is to commence.

In some embodiments, the queue manager may determine that a time duration of storage of all the one or more messages in the first message queue from the first release and the second release is greater than a predefined expiration time. In some embodiments, transferring the first communication channel for exchanging one or more messages from the first release to the second release from the first message queue to the second message queue may further include transferring the first communication channel for exchanging one or more messages from the first release to the second release from the first message queue to the second message queue, responsive to determining that the time duration of storage of all the one or more messages in the first message queue is greater than the predefined expiration time. In some embodiments, the queue manager may remove the first message queue, responsive to the first release ceasing to write to and read from the first message queue and to the second release ceasing to write to and read from the first message queue.

In some embodiments, establishing the second message queue may include configuring, responsive to deploying a first application update of the one or more application updates. The second communication channel of the second message queue may be read by the first release. In some embodiments, establishing the second message queue may include configuring, responsive to deploying the first application update, the first release to commence reading from the second communication channel of the second message queue and to continue reading from the first communication channel of the first message queue.

In some embodiments, establishing the second message queue may include configuring, responsive to deploying a second application update of the one or more application updates subsequent to a first application update. The second communication channel of the second message queue may be written to and read from by the second release and may be read by the first release In some embodiments, establishing the second message queue may include configuring, responsive to deploying a third application update of the one or more application updates subsequent to a first application update and a second application update. The second communication channel of the second message queue may be written to and read from both the first release and the second release. In some embodiments, establishing the second message queue may include configuring, responsive to deploying the third application, the first release to cease writing to the first communication channel of the first message queue and to commence writing to the second communication channel of the second message queue.

In some embodiments, establishing the second message queue may include configuring, responsive to deploying a fourth application update of the one or more application updates subsequent to a first application update, a second application update, and a third application update, the second release to cease reading from the first communication channel of the first message queue. In some embodiments, maintaining the first message queue may include configuring, responsive to deploying a fifth application update of the one or more application updates subsequent to a first application update, a second application update, a third application update, and a fourth application update. The first release may cease reading from the first communication channel of the first message queue.

In some embodiments, maintaining the first message queue may include maintaining the first message queue configured to store a first set of messages from the first release in a first write channel of the first communication channel. The first set of messages may include first runtime data for an application of a first version executing on the first release. The first set of messages may be stored in the first write channel to be read by the second release via a first read channel of the first communication channel. In some embodiments, maintaining the first message queue may include maintaining the first message queue configured to store a second set of messages from the second release in a second write channel the first communication channel. The second set of messages may include second runtime data for the application of a second version executing on the second release. The second set of messages may be stored in the first write channel to be read by the first release via a second read channel of the first communication channel.

Another aspect of this disclosure is directed to a system for maintaining message queues during deployments of application updates. The system may include a queue manager executable on one or more processors. The queue manager may maintain a first message queue including a first communication channel for storing one or more messages exchanged between a first release and a second release. The first release may write to and read from the first message queue, the second release writing to and reading from the first message queue. The queue manager may establish, responsive to deploying one or more application updates to one of the first release or the second release, a second message queue including a second communication channel for storing one or more messages exchanged between the first release and the second release. The first release may continue to write to and read from the first message queue and read from the second message queue. The second release may read from the first message queue and cease writing to the first message queue. The second release may write to and read from the second message queue. The queue manager may transfer the first communication channel from the first message queue to the second message queue. The first release may cease writing to and reading from the first message queue. The second release may cease reading from the first message queue.

In some embodiments, the queue manager may determine that a deployment of an application update of the one or more application updates to one of the first release and the second release is to commence. In some embodiments, the queue manager may establish the second message queue responsive to the determination that deployment of the application update is to commence.

In some embodiments, the queue manager may determine that a time duration of storage of all the one or more messages in the first message queue from the first release and the second release is greater than a predefined expiration time. In some embodiments, the queue manager may transfer from the first message queue to the second message queue, responsive to the determination that the time duration of storage of all the one or more messages in the first message queue is greater than the predefined expiration time.

In some embodiments, the queue manager may remove the first message queue, responsive to the first release ceasing to write to and read from the first message queue and to the second release ceasing to write to and read from the first message queue.

In some embodiments, the queue manager may establish the second message queue by configuring, responsive to deploying a first application update of the one or more application updates, the second communication channel of the second message queue to be read by the first release. In some embodiments, the queue manager may establish the second message queue by configuring, responsive to deploying the first application update. The first release may commence reading from the second communication channel of the second message queue and may continue to read from the first communication channel of the first message queue.

In some embodiments, the queue manager may establish the second message queue by configuring, responsive to deploying a second application update of the one or more application updates subsequent to a first application update. The second communication channel of the second message queue may be written to and read from by the second release and to be read by the first release. In some embodiments, the queue manager may establish the second message queue by configuring, responsive to deploying the second application update. The second release may write to and read from the second communication channel of the second message queue and may cease writing to the first communication channel of the first message queue.

In some embodiments, the queue manager may establish the second message queue by configuring, responsive to deploying a third application update of the one or more application updates subsequent to a first application update and a second application update. The second communication channel of the second message queue may be written to and read from both the first release and the second release. In some embodiments, the queue manager may establish the second message queue by configuring, responsive to deploying the third application, the first release to cease writing to the first communication channel of the first message queue and to commence writing to the second communication channel of the second message queue.

In some embodiments, the queue manager may establish the second message queue by configuring, responsive to deploying a fourth application update of the one or more application updates subsequent to a first application update, a second application update, and a third application update.

The second release may cease reading from the first communication channel of the first message queue.

In some embodiments, the queue manager may establish the second message queue by configuring, responsive to deploying a fifth application update of the one or more application updates subsequent to a first application update, a second application update, a third application update, and a fourth application update. The first release may cease reading from the first communication channel of the first message queue.

In some embodiments, the first message queue may store a first set of messages from the first release in a first write channel of the first communication channel. The first set of messages may include first runtime data for an application of a first version executing on the first release. The first set of messages may be stored in the first write channel to be read by the second release via a first read channel of the first communication channel. In some embodiments, the first message queue may store a second set of messages from the second release in a second write channel the first communication channel. The second set of messages may include second runtime data for the application of a second version executing on the second release. The second set of messages may be stored in the first write channel to be read by the first release via a second read channel of the first communication channel.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
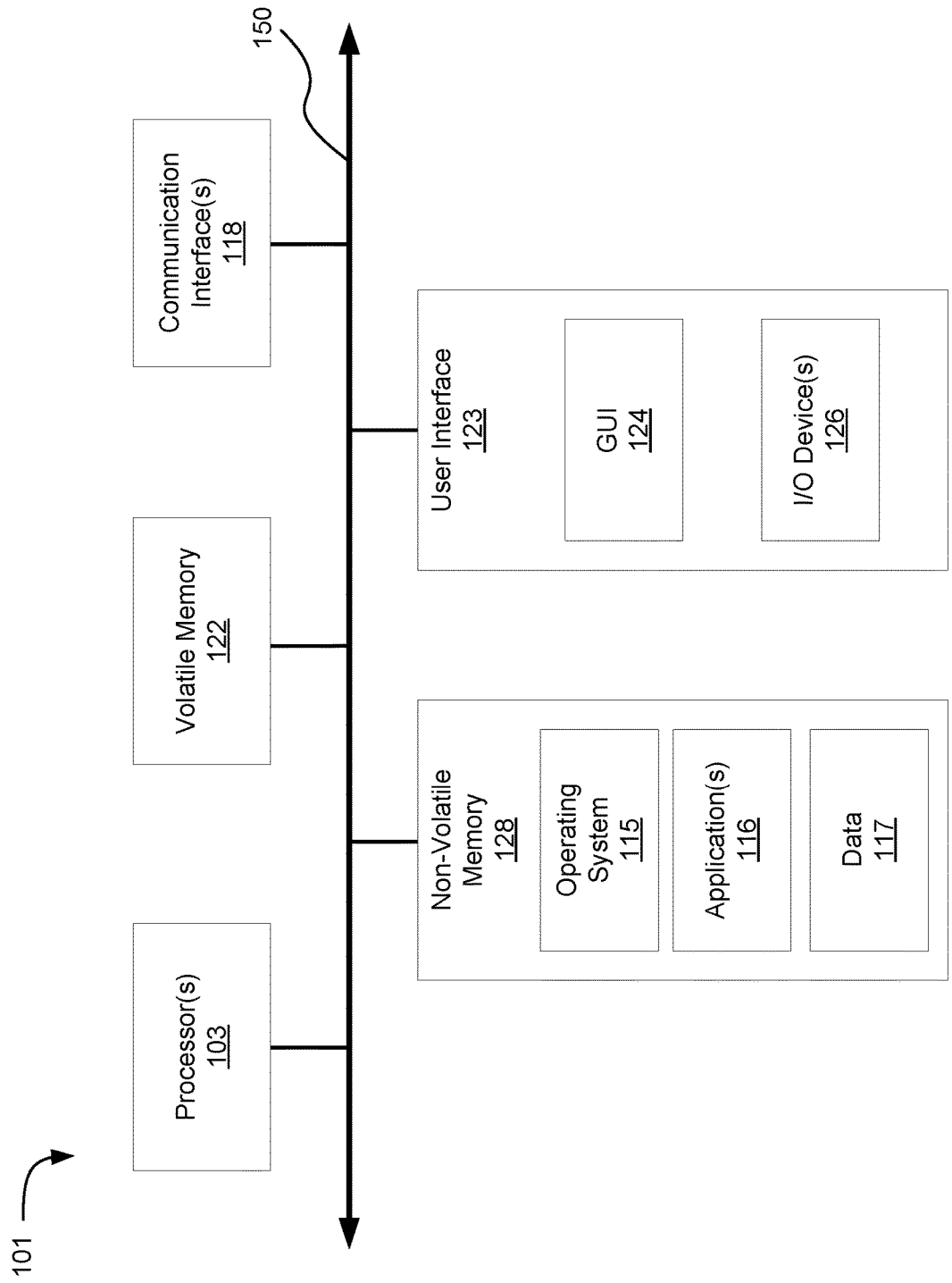
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for maintaining message queues during deployments of application updates.

A. Computing Environment

Prior to discussing the specifics of embodiments of the systems and methods of an appliance and/or client, it may be helpful to discuss the computing environments in which such embodiments may be deployed.

As shown in FIG. 1, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1 is shown merely as an example, as clients, servers and/or appliances may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, the computing device 101 may execute an application on behalf of a user of a client computing device, may execute a virtual machine, which provides an execution session within which applications execute on behalf of a user or a client computing device, such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Maintaining Message Queues During Deployments of Application Updates

The present disclosure is directed towards systems and methods for maintaining message queues during deployments of application updates. To measure and compare the performance of various versions of an application, a deployment instrumentation service may perform a two-sample hypothesis testing (also referred to as A/B testing, bucket testing, or split-run testing). In one experiment setup, the service may provide a control version of the application to a control release group of clients to execute and may provide a variable version of the application a variable release group of clients to execute. During testing, each release group of clients may write runtime data onto a cache at the deployment instrumentation service. Furthermore, in certain circumstances, one release group may exchange messages with the other release group via a message queue maintained by the service. The runtime data and messages may be written onto and read from storage of the service in accordance to a set of data validation rules. The data validation rules may include database constraints, cascades, and/or triggers. The database constraints may specify relations between entries. The cascades may include protocols for performing a rollback on the data on storage at the service. The triggers may include protocols for performing various functions in response to pre-specified event.

When deploying one version of the application to one of the release groups in a switch fabric release, data consistency in the runtime data in the cache and the messages in the message queue may deteriorate. The loss in data consistency may arise from differences in how the data is generated between the various versions of the application data. Existing techniques of addressing the degradation or loss in data consistency of data stored in the system may depend on the amount of data to be changed between the two versions of applications. The time to deploy subsequent version may therefore vary based on the degree of the difference between various versions of the application. In such setups, all the data from multiple deployments may be maintained onto one storage. As such, there may be obsolete data from older deployments in storage. Moreover, even with such techniques, data consistency in the messages stored in the queue may not be fully preserved, potentially resulting in messages being written or read by one release group out of order or the same messages being written or read multiple times during switch fabric releases. The reading of a message multiple times by either release group may result in service errors. In addition, with each additional deployment, there may be not enough storage to handle the increasing amount of runtime data stored in the caches and messages in the message queue.

To maintain stability and to resolve degradation and/or loss in data consistency in the stored data and messages, the present systems and methods provide a migration plan of messages for application update deployments in a two-sample hypothesis testing environment. With the migration plan, not only may data consistency be preserved but also messages may be continuously communicated between the release groups during the application update deployment in a forward and a backward direction. Prior to any deployment, a first message queue may have been established with two communication channels to exchange messages between a first release group (e.g., the variable group) and a second release group (e.g., the control group). There may be a first communication channel for messages traveling from the first release group to the second release group and a second communication channel for messages traveling from the second release group to the first release group. Initially, both the first release group and the second release group may write to and read from the first message queue. With subsequent deployments of the application updates, the service may continue to monitor runtime data from each of the release groups. In addition, the service may transfer or migrate the two communication channels from the initial message queue to another message queue in the manner detailed below.

With a first deployment of the application update, a queue manager of the service may initialize a second message queue. The first release group may read from the second message queue, while also writing to and reading from the first message queue. In the meanwhile, the second release group may continue to write to and read from the first message queue. In this manner, the first release group and the second release group may continue to exchange messages via the two communication channels through the first message queue.

Upon completion of the first deployment, the service may commence with the second deployment of the application update. The second release group may be set to discontinue or cease writing to the first message queue and instead write to the second message queue. As the first release group continues to write to the first message queue and the second release is now reading from the first message queue, messages may flow from the first release group via the first communication channel through the first message queue to the second release group. Furthermore, as the second release group now writes to the second message queue and the first release group continues to read from the first message queue, messages may flow from the second release group via the second communication channel through the second message queue to the first release group. In this manner, the communication channel through the first message queue may continue to be operational.

When the second deployment has finished, the service may start with the third deployment of the application update. At this point, the first release group may be set by the queue manager to stop writing to the first messaging group. As a result, no new messages may be written onto the first message queue from either the first release group or the second release group. The first release group and the second release group may continue to read from the first message queue, as old messages may still be stored on the first message queue. Additionally, the first release group and the second release group now both write to the second message queue. New messages from the first release group and the second release group may be exchanged via the second message queue. As such, now both the first communication channel and the second communication channel may be both through the second message queue.

After the third deployment of the application update, the service may initiate a fourth deployment of the application update. The queue manager may determine whether messages from the first release group stored in the first message queue have expired. If the messages have expired, the second release group may be set to cease reading from the first message queue. The first release group may continue to read from the first message queue. As before, both the first release group and the second release group may continue to write to and read from the second message queue. All new messages thus from the first release group or the second release group may be exchanged through the communication channels of the second message queue.

With the end of the fourth deployment of the application update, the service may begin a fifth deployment of the application update. The queue manager may determine whether messages from the second release group stored in the first message queue have expired. If the messages have expired, the first release group may be set to cease reading from the first message queue. At this stage, both the first release group and the second release group may continue to write to and read from the second message queue. With the messages from either the first release group or the second release group in the first message queue all expired, the queue manager may remove or delete the first message queue.

In this manner, the migration of the communication channels from one message queue to another message queue may be complete. Since writing or reading by each release group is changed at each deployment, data consistency in the cached runtime data may be maintained across the multiple deployments. In addition, as the communication channels are transferred from one queue to another, messages may be continuously communicated between the two release groups during the application update deployment in a forward and a backward direction.

Stated differently, the present disclosure describes a system that can exhibit a Redis migration plan for A/B canary releases. The migration plan can maintain data consistency when migrating between two Redis™ message queues and caches. Also, to ensure that there are no system errors, the system may keep and maintain only one active communication channel in one of the Redis™ message queues in a forward direction and a backward direction respectively during the duration of the migration.

Figure 2:
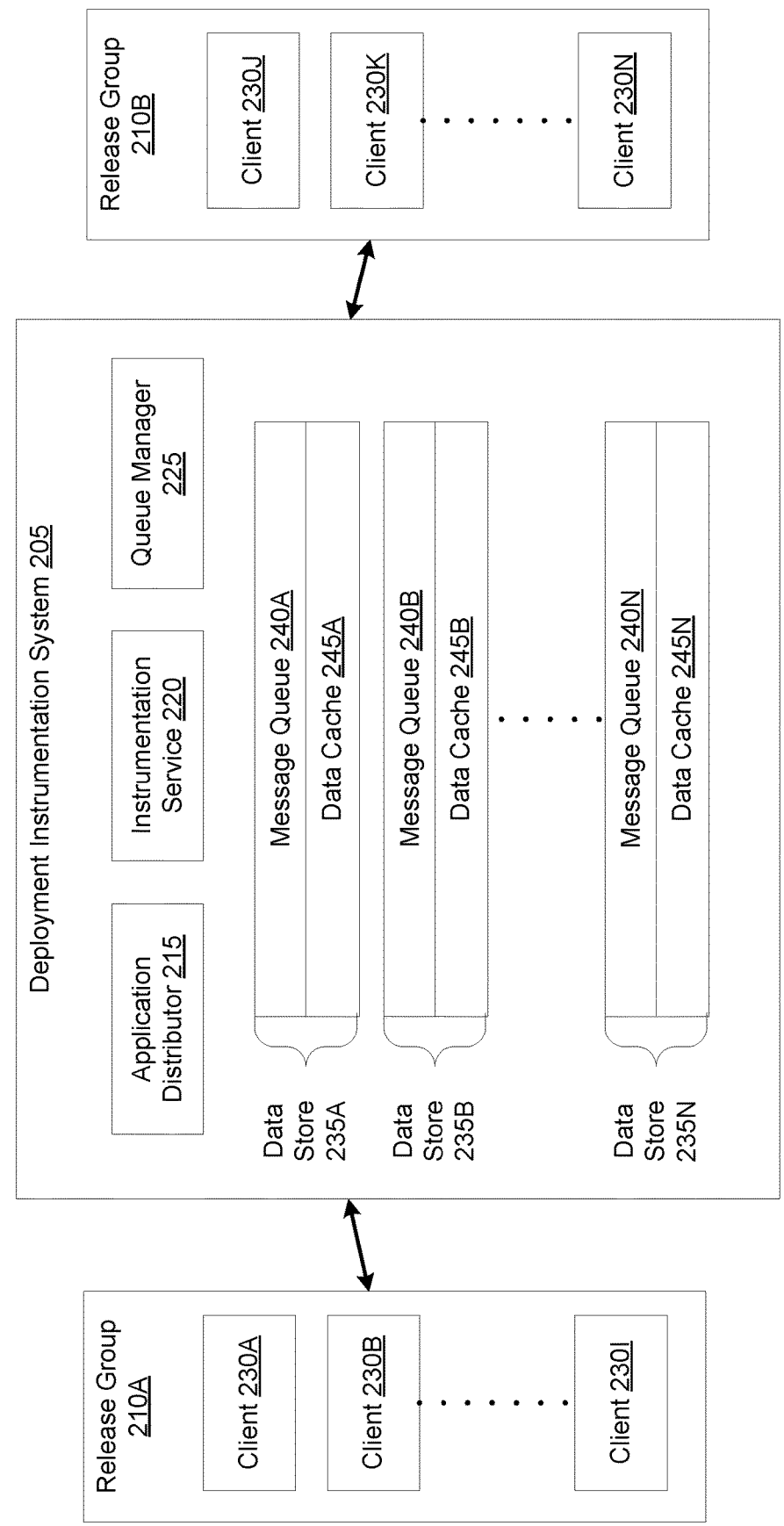
FIG. 2 is a block diagram of an embodiment of a system for maintaining message queues during deployments of application updates.

Referring now to FIG. 2, depicted is a block diagram of an embodiment of a system 200 for maintaining message queues during deployments of application updates. The system 200 may include a deployment instrumentation system 205, a first release group 210A, and a second release group 210B, among others. In some embodiments, the deployment instrumentation system 205 may be a cloud service, such as an infrastructure as a service (IaaS), platform as a service (PaaS), or a software as a service (SaaS), providing resources to the release groups. The deployment instrumentation system 205 may include an application distributor 215, an instrumentation service 220, a queue manager 225, and one or more data stores 235A-N. Each data store 235A-N may include at least one message queue 240A-N and/or at least one data cache 245A-N. The first release group 210A may include a set of clients 230A-I. The second release group 210B may include another set of clients 230J-N. In some embodiments, the clients 230A-N may be divided into three or more release groups.

Each of the above-mentioned elements or entities is implemented in hardware, or a combination of hardware and software, in one or more embodiments. Each component of the system 200 may be implemented using hardware or a combination of hardware or software detailed above in connection with FIG. 1. For instance, each of these elements or entities can include any application, program, library, script, task, service, process or any type and form of executable instructions executing on hardware of the deployment instrumentation system 205 including the application distributor 215, the instrumentation service 220, the queue manager 225, and the one or more data stores 235A-235N and the clients of 230A-N (hereinafter generally referred to as client 230) of the release groups 210A and 210B. The hardware includes circuitry such as one or more processors in one or more embodiments.

The application distributor 215 may manage one or more deployments of an application update to the release groups 210A and 210B. Each application update may correspond to a different version of the application. Each version of the application may include or exclude one or more functionalities included in another version of the application. In some embodiments, a version identifier may be included in metadata of the application. Each version of the application may include an instrumentation script for measuring runtime data of the application running on the client 230. In some embodiments, the deployment may correspond to a release of the application update to the release groups 210A or 210B. In some embodiments, the deployment may correspond to a switching of the application update between the release groups 210A and 210B.

The application distributor 215 may send, transmit, or otherwise provide the application update to the release groups 210A and 210B. The application distributor 215 may provide a first version of the application to the clients 230 of the first release group 210A and a second version of the application to the clients 230 of the second release group 210B. In some embodiments, the application distributor 215 may successively deploy the application update to the release groups 210A and/or 210B in response to a completion of a previous provision of another application update. In some embodiments, the application distributor 215 may deploy the application update to one of the release groups 210A or 210B for each deployment. In some embodiments, the application distributor 215 may maintain one or more counters for identifying the version of the application provided to the corresponding release group 210A and 210B. In some embodiments, the application distributor 215 may determine whether a current deployment of the application update to the release group 210A and 210B is complete. In response to the determination, the application distributor 215 may identify the next application update (e.g., an application with a more recent version number). The application distributor 215 may then commence the subsequent deployment of the application update. In some embodiments, the application distributor 215 may perform a switch fabric release in that the version of the application running on the clients 230 from one release group 210A or 210B is the same as that of the previous deployment while the version running on the clients 230 of the other release group 210B or 210A differs from that of the previous deployment. The functionalities of the application distributor 215 may be repeated across more than two release groups.

With each application update, the instrumentation service 220 may perform a two-sample hypothesis testing with the release groups 210A and 210B. In performing the testing, the instrumentation service 220 may monitor the runtime data of each client 230 in each release group 210A and 210B. The runtime data may include performance-related metrics for the application update running at the corresponding client 230, such as execution times of each functionality, response times for each functionality, a rate of function calls, network usage, and memory consumption, among others. In some embodiments, the instrumentation service 220 may measure the runtime data from each client 230 in each release group 210A and 210B. In some embodiments, the instrumentation service 220 may receive the runtime data from the instrumentation script of the application executing on the respective client 230. In some embodiments, the instrumentation service 220 may identify the runtime data from each client 230 by the corresponding version of the application.

As the testing is performed, the instrumentation service 220 may write or store the runtime data from the client 230 onto the data stores 235A-N. Each data store 235A-N may be used to store data for one or more deployments of the application updates or versions of the application. In some embodiments, each data store 235A-N along with the message queue 240A-N and the data cache 245A-N may be implemented using Redis™. In some embodiments, the instrumentation service 220 may identify the data store 235A-N for the deployment of the application update corresponding to the runtime data. The instrumentation service 220 may then write or store the runtime data onto the identified data cache 245A-N. In some embodiments, the instrumentation service 220 may include a deployment stage indicator with runtime data stored onto the data cache 245A-N to indicate which deployment stage the runtime data was gathered.

In some embodiments, the instrumentation service 220 may write or store the runtime data onto the data cache 245A-N in accordance with one or more data validation rules. The data validation rules may include database constraints, cascades, and/or triggers. The database constraints may specify relations between entries of stored runtime data on the data cache 245A-N. The cascades may include protocols for performing a rollback on the data on data cache 245A-N. The triggers may include protocols for performing various functions on the data of the data cache 245A-N in response to pre-specified event. In some embodiments, the instrumentation service 220 may perform a multi-sample hypothesis across more than two release groups, and may run the similar functionality as with two release groups 210A and 210B.

The queue manager 225 may maintain one or more message queues 240A-N for the respective data store 235A-N as the testing is performed on the clients 230 of the release groups 210A and 210B. Each message queue 240A-N may include a communication channel (sometimes referred to as a publication/subscription channel) for exchanging one or more messages between the clients 230. In some embodiments, a first communication channel may be formed through the message queue 240A-N when a first release group 210A writes to the message queue 240A-N and a second release group 210B reads from the same message queue 240A-N. A second communication channel may be formed through the same message queue 240A-N when the first release group 210A reads from the message queue and the second release group 210B writes to the message queue 240A-N. The communication channel in each message queue 240A-N may provide for asynchronous communications between the clients 230 of the release groups 210A and 210B. Messages may be placed by the clients 230 of one release group 210A or 210B into the message queue 240A-N to be read by the clients 230 of the other release group 210B or 210A. In some embodiments, the communication channel of each message queue 240A-N may include one or more read channels (sometimes referred to as subscription) for the clients 230 of the one release group 210A or 210B to read messages from the clients 230 of the other release group 210A or 210B. In some embodiments, the communication channel of each message queue 240A-N may include one or more write channels (sometimes referred to as publication) for the clients 230 of the one release group 210A or 210B to write messages to be read by the clients 230 of the other release group 210A or 210B. The messages may include runtime data (e.g., performance-related metrics), commands (e.g., a request to start a task or process), or notifications (e.g., completion of a task or process), among others. The messages may be from the different version of the application running the clients 230 of each release group 210A and 210B. In some embodiments, a first set of messages may include the runtime data, the commands, or the notifications, among others, from a corresponding version (e.g., a first version) of the application executing on the clients 230 of the first release group 210A. In some embodiments, a second set of messages may include the runtime data, the commands, or the notifications, among others, from a corresponding version (e.g., a second version) of the application executing on the clients 230 of the second release group 210B.

In connection with each deployment of an application update, the queue manager 225 may configure or otherwise set the clients 230 of each release group 210A and 210B to read to or write from the one or more message queues 240A-N. Further, with each additional deployments of the application updates, the queue manager 225 may establish, create, or instantiate new message queues 240A-N to store messages exchanged between the clients 230 of the first release group 210A and of the second release group 210B for the additional deployment. With the establishment of the new message queues 240A-N, the queue manager 225 may migrate or transfer the communication channels from previously established message queues 240A-N to newly instantiated message queues 240A-N by configuring the release groups 210A or 210B to read from or write to the message queues 240A-N as shown in sequence diagrams of FIGS. 3A-3F of deployment of the application updates at various stages 300A-F. The queue manager 225 may also set the clients 230 of each release group 210A and 210B to read from or write to the newly established message queues 240A-N. By migrating and transferring the communication channels in this manner, the queue manager 225 may preserve data consistency of the data stored in the data store 235A-N while providing new application updates.

Figure 3A:
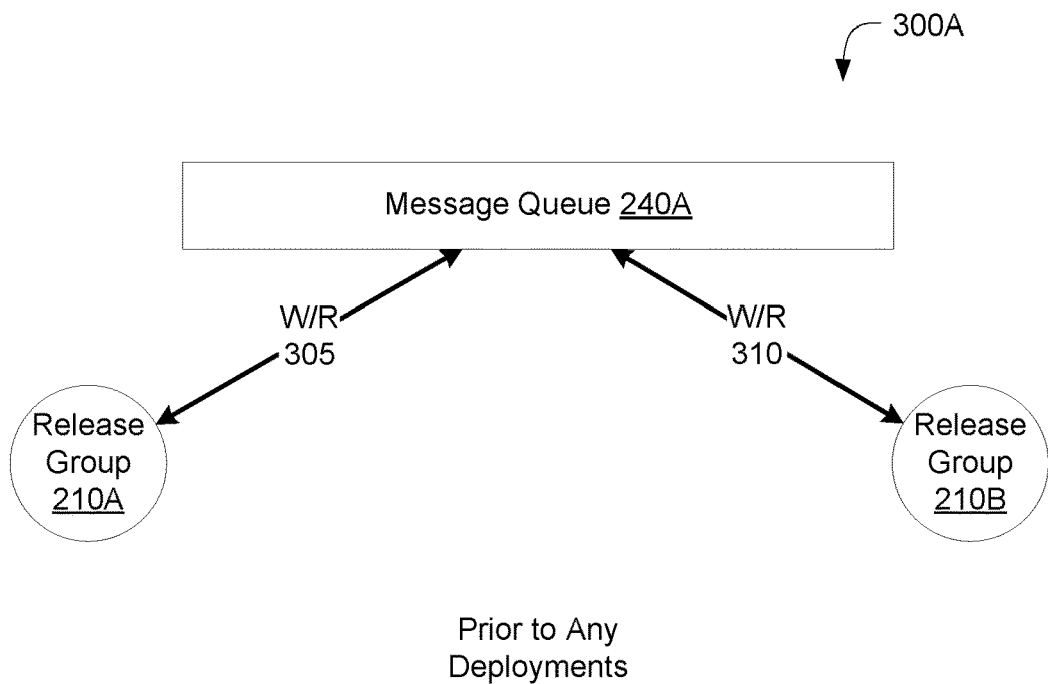
FIGS. 3A-3F are sequence diagrams of an embodiment for a system for maintaining message queues during deployments of application updates.

Referring first to the stage 300A as shown in FIG. 3A, the queue manager 225 may initially maintain a first message queue 240A prior to any deployments of application updates. The first message queue 240A may store messages exchanged between the first release group 210A and the second release group 210B via multiple communication channels. The queue manager 225 may have configured or set the first release group 210A to write to and read from the first message queue 240A (W/R path 305). In some embodiments, the queue manager 225 may have established a write channel and/or read channel (communication path 305) for the first release group 210A. The queue manager 225 may have also configured or set the second release group 210B to write to and read from the second message queue 240B (W/R path 310). In some embodiments, the queue manager 225 may have established a write channel and/or read channel (communication path 310) for the second release group 210A to the first message queue 240A. The clients 230 of the first release group 210A may execute a first version (e.g., a test or variable version) of the application. The clients 230 of the second release group 210B may execute a second version (e.g., a control version) of the application.

The instrumentation service 220 may monitor, measure, or receive the runtime data of each client 230 in the first release group 210A and the second release group 210B. The runtime data for the first release group 210A may include performance-related metrics for the corresponding version of the application running on the clients 230 of the first release group 210A. The runtime data for the second release group 210B may include performance-related metrics for the corresponding version of the application running on the clients 230 of the second release group 210B. The instrumentation service 220 may establish and maintain a first data cache 245A for storing runtime data from the first release group 210A and the second release group 210B. In some embodiments, the instrumentation service 220 may configure or set the first release group 210A and the second release group 210B to write the runtime data onto the first data cache 245A. As the runtime data is measured or received, the instrumentation service 220 may write or store the runtime data onto a first data cache 245A.

In addition, the application distributor 215 may commence deployment of the application updates to the clients 230 of the first release group 210A. In some embodiments, the application distributor 215 may receive a request to commence deployment from an administrator. The request may indicate one or more versions of the application to deploy to the clients 230 of the first release group 210A and to the clients 230 of the second release group 210B. In some embodiments, the application distributor 215 may commence deployment of the application updates to the clients 230 of the first release group 210A and of the second release group 210B in accordance with a deployment schedule. The deployment schedule may specify one or more times at which to provide the application update to the first release group 210A and to the second release group 210B. As a result of the deployment, clients 230 of the first release group 210A may receive one version of the application and/or clients 230 of the second release group 210B may receive another version of the application from the application distributor 215.

Figure 3B:
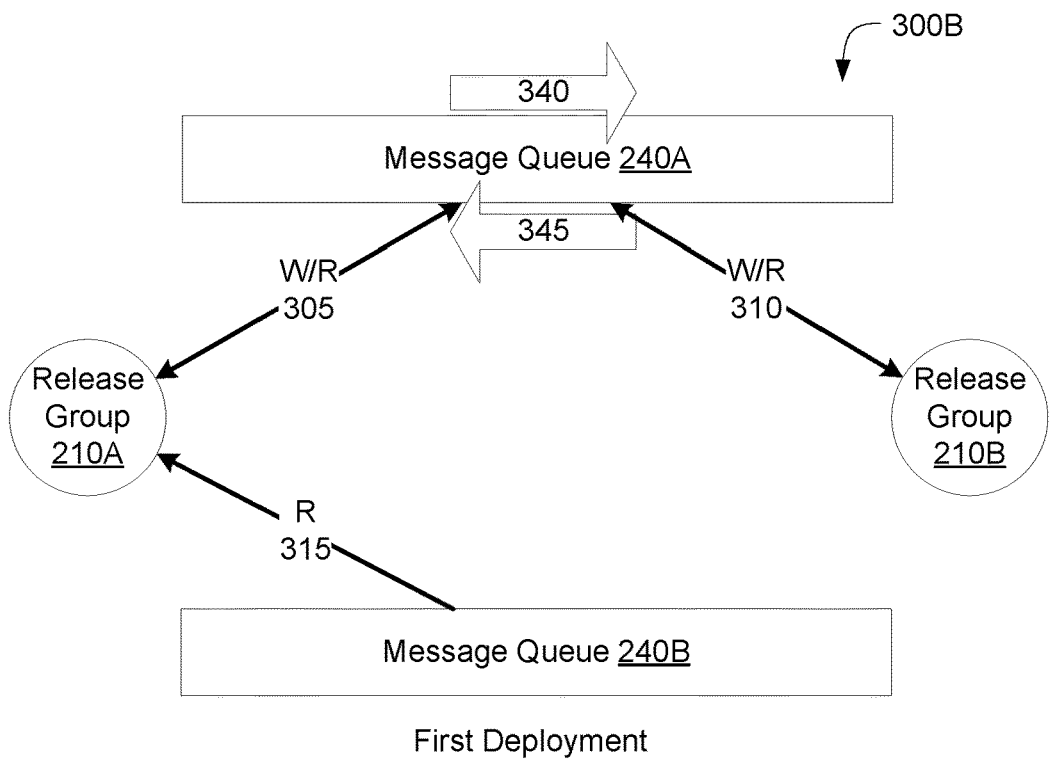

Referring now to the second stage 300B as shown in FIG. 3B, in connection with the first deployment of the application update to the first release group 210A, the queue manager 225 may establish a second message queue 240B. In some embodiments, the queue manager 225 may instantiate the second message queue 240B along with the data store 235B. In some embodiments, the queue manager 225 may determine whether the first deployment of the application update is to commence. Upon determining that the first deployment is to commence, the queue manager 225 may establish, create, or instantiate the second message queue 240B of the second data store 235B. The second message queue 240B may include a communication channel for storing messages exchanged between the first release group 210A and the second release group 210B. During the stage 300B, the communication channel of the second message queue 240B may be empty.

The queue manager 225 may configure or set the first release group 210A to commence reading from the second message queue 240B. In some embodiments, the queue manager 225 may establish a read channel (R path 315) for the first release group 210A. The first release group 210A may continue to write to and read from the first message queue 240A (e.g., W/R path 305). The second release group 210B may also continue to write to and read from the first message queue 240A (e.g., via W/R path 310). As such, messages may flow from the first release group 210A through the first message queue 240A to the second release group 210B via communication channel 340. Conversely, messages may flow from the second release group 210B through the first message queue 240A to the first release group 210A via communication channel 345.

During stage 300B, the instrumentation service 220 may continue to perform the two-sample hypothesis testing on the first release group 210A and the second release group 210B running the respective versions of the application of the first deployment. The instrumentation service 220 may monitor, measure, or receive the runtime data of each client 230 in the first release group 210A and the second release group 210B. The instrumentation service 220 may also determine whether the first deployment of the application update is to commence. Upon determining that the first deployment is to commence, the instrumentation service 220 may establish, create, or instantiate the second data cache 245B of the second data store 235B for storing runtime data from the first release group 210A and the second release group 210B. At this stage 300B, the second data cache 245 may remain empty. As the testing for the first deployment of the application update is performed, the instrumentation service 220 may monitor a testing progress of the first release group 210A and the second release group 210B. The testing progress may indicate a percentage of completion of the testing. When the testing progress reaches 100%, the instrumentation service 220 may determine that the testing is complete for the first deployment.

The application distributor 215 may determine whether the first deployment of the application update is complete. In some embodiments, the application distributor 215 may monitor a deployment progress of the first deployment of the application update to the first release group 210A. The deployment progress may indicate a percentage of completion of the first deployment of the application update to the first release group 210A. In some embodiments, the deployment progress may indicate a percentage of completion of the first deployment of the version of the application to the clients 230 of the first release group 210A for the first deployment. When the deployment progress becomes 100%, the application distributor 215 may determine that the first deployment of the application update is complete.

Upon the determination that the first deployment of the application update is complete and/or the testing for the first deployment is complete, the application distributor 215 may commence a second deployment of the application update to the clients 230 of the second release group 210B. In carrying out the second deployment of the application update, clients 230 of the first release group 210A may have already been provided with one version of the application and/or clients 230 of the second release group 210B may receive another version of the application from the application distributor 215.

Figure 3C:
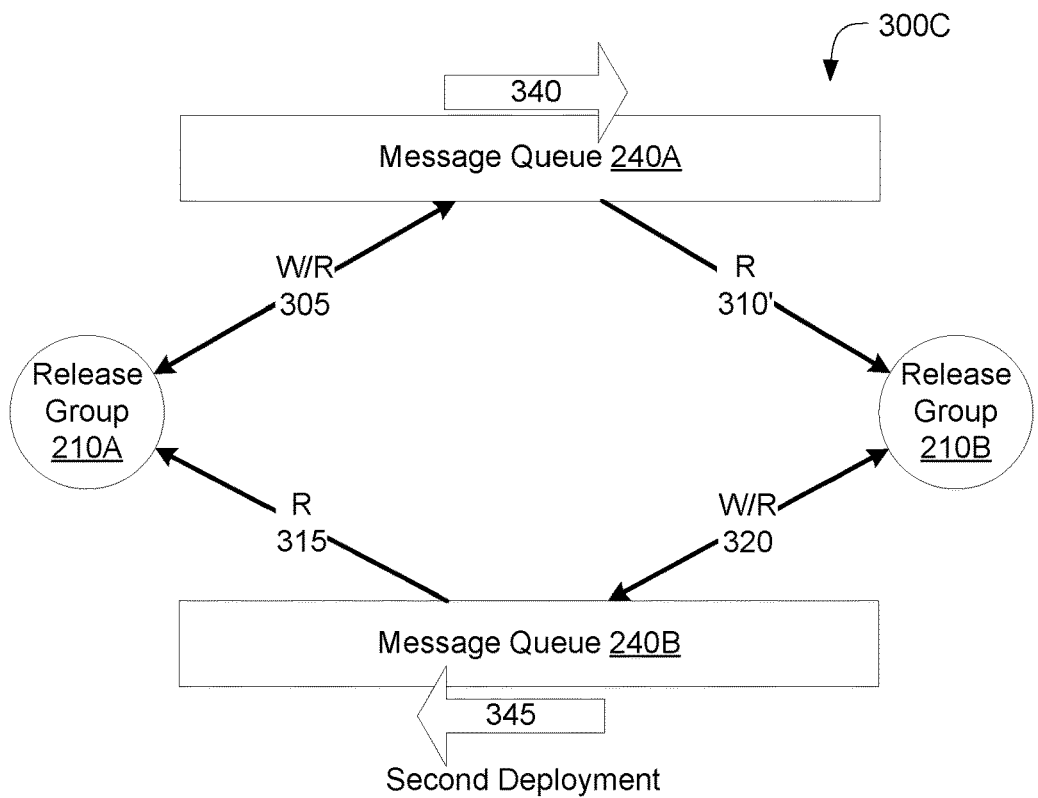

Referring now to the third stage 300C as shown in FIG. 3C, in connection with the second deployment of the application update to the second release group 210B, the queue manager 225 may configure or set the second release group 210B to write to and read from the second message queue 240B (W/R path 320). In some embodiments, the queue manager 225 may also establish a write channel and/or read channel (communication path 320) for the second release group 210B. As such, the second message queue 240B may no longer be empty and store messages from the second release group 210B. In addition, the queue manager 225 may configure or set the second release group 210B to cease writing to the first message queue 240A (R path 310'). In some embodiments, the queue manager 225 may terminate the write channel (communication path 310) for the second release group 210B to the first message queue 240A. On the other hand, the first release group 210A may continue to read from and write to the first message queue 240A (via W/R path 305) and may continue reading from the communication channel of the second message queue 240B (via R path 315).

With this configuration, messages may continue to flow from the first release group 210A through the communication channel of the first message queue 240A to the second release group 210B (via communication channel 340). As a result, all the messages from the first release group 210A may continue to be read once and in order by the second release group 210B. Conversely, messages may flow from the second release group 210B through the communication channel of the second message queue 240B to the first release group 210A via communication channel 345. In this manner, the communication channel of messages from the second release group 210B to the first release group 210A may be transferred from the first message queue 240A to the second message queue 240B. Furthermore, all the messages from the second release group 210B may continue to be read once and in order by the first release group 210A.

The instrumentation service 220 may continue to perform the two-sample hypothesis testing on the first release group 210A and the second release group 210B running the respective versions of the application of the second deployment. In performing the testing, the instrumentation service 220 may continue to monitor, measure, or receive the runtime data of each client 230 in the first release group 210A and the second release group 210B. The instrumentation service 220 may also determine whether the second deployment of the application update is to commence or whether the first deployment has finished. Upon determining that the second deployment is to commence or that the first deployment has finished, the instrumentation service 220 may begin writing the runtime data of the version of the application running on the clients 230 of the second release group 210B onto the second data cache 245B. In some embodiments, the instrumentation service 220 may configure or set the second release group 210B to write the runtime data onto the second data cache 245B and to cease writing runtime data onto the first data cache 245A. The instrumentation service 220 may continue to write the runtime data of the version of the application running on the clients 230 of the first release group 210A.

The application distributor 215 may determine whether the second deployment of the application update is complete. In some embodiments, the application distributor 215 may monitor a deployment progress of the second deployment of the application update to the clients 230 of the second release group 210B. The deployment progress may indicate a percentage of completion of the second deployment of the application update to the second release group 210B. In some embodiments, the deployment progress may indicate a percentage of completion of the second deployment of the version of the application to the clients 230 of the second release group 210B for the second deployment. When the deployment progress becomes 100%, the application distributor 215 may determine that the second deployment of the application update is complete.

Upon the determination that the second deployment is complete and/or the testing for the second deployment is complete, the application distributor 215 may commence a third deployment of the application update to the clients 230 of the first release group 210A. In carrying out the third deployment of the application update, clients 230 of the first release group 210A may receive a new version of the application and/or clients 230 of the second release group 210B may have been already provided with another version of the application from the application distributor 215.

Figure 3D:
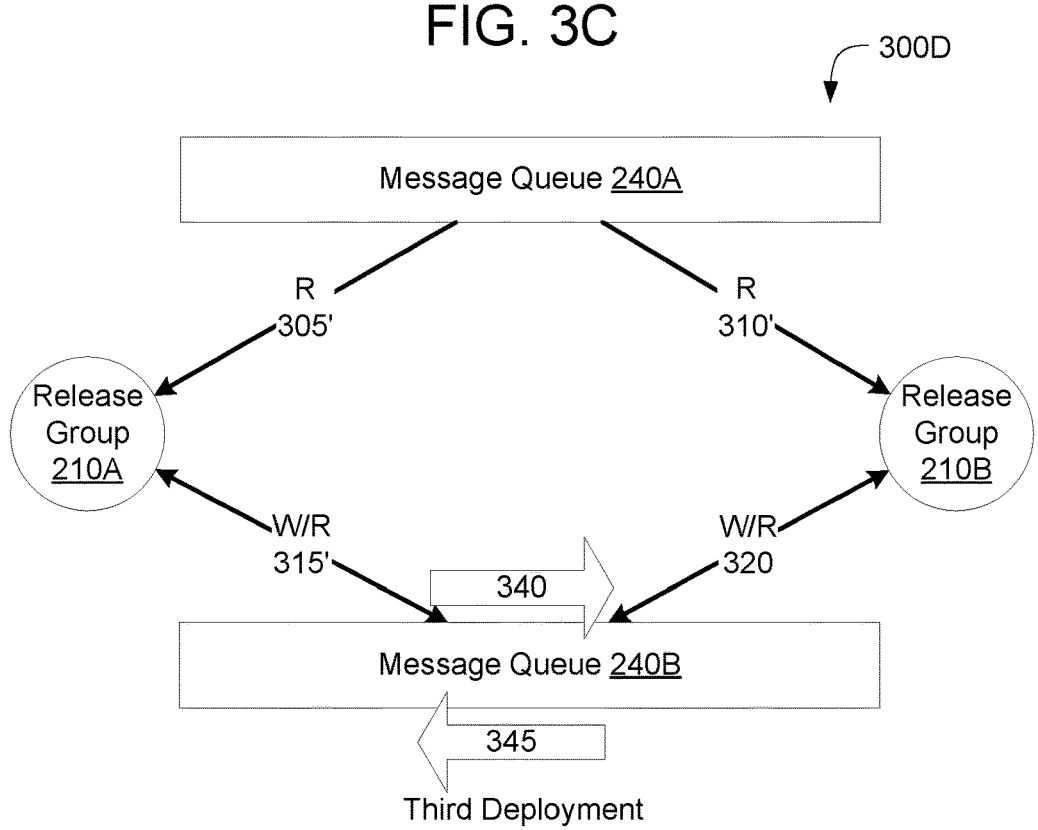

Referring now to the fourth stage 300D as shown in FIG. 3D, in connection with the third deployment of the application to the first release group 210A, the queue manager 225 may configure or set the first release group 210A to cease writing messages onto the first message queue 240A (R path 305'). In some embodiments, the queue manager 225 may terminate the write channel (communication path 305') for the first release group 210A to the first message queue 240A. At this stage, there may no longer be new messages from either the first release group 210A or the second release group 210B stored on the first message queue 240A. Furthermore, the queue manager 225 may configure or set the first release group 210A to commence writing messages onto the first message queue 240A (W/R path 315'). In some embodiments, the queue manager 225 may establish a read channel (communication path 315') for the first release group 210A to the first message queue 240A. The second release group 210B may continue to read from the first message queue 240A (R path 310') and to write to and read from the second message queue 240B (W/R path 320).

With this configuration, messages may cease flowing through the communication channel of the first message queue 240A from either the first release group 210A or the second release group 210B. Consequently, all the messages from the first message queue 240A read by the first release group 210A and the second release group 210B may be those from prior deployments. In addition, messages from the first release group 210A may flow through the second message queue 240B to the second release group 210B via communication channel 340. Also, the messages from the second release group 210B may continue to flow through the first message queue 240A via communication channel 345.

The instrumentation service 220 may continue to perform the two-sample hypothesis testing on the first release group 210A and the second release group 210B running the respective versions of the application of the third deployment. In performing the testing, the instrumentation service 220 may continue to monitor, measure, or receive the runtime data of each client 230 in the first release group 210A and the second release group 210B. The instrumentation service 220 may also determine whether the third deployment of the application update is to commence or whether the second deployment has finished. Upon determining that the third deployment is to commence or that the second deployment has finished, the instrumentation service 220 may begin writing the runtime data of the version of the application running on the clients 230 of the first release group 210A onto the second data cache 245B. In some embodiments, the instrumentation service 220 may configure or set the first release group 210A to write the runtime data onto the second data cache 245B and to cease writing runtime data onto the first data cache 245A. The clients 230 of the second release group 210B may continue to write runtime data onto the second data cache 245B. As such, all the runtime data on the first data cache 245A may be from prior deployments and all the new runtime data from the first release group 210A and the second release group 210B may be stored on the second data cache 245B.

The application distributor 215 may determine whether the third deployment of the application update is complete. In some embodiments, the application distributor 215 may monitor a deployment progress of the third deployment of the application update to the first release group 210A. The deployment progress may indicate a percentage of completion of the third deployment of the application update to the first release group 210A. In some embodiments, the deployment progress may indicate a percentage of completion of the second deployment of the version of the application to the clients 230 of the first release group 210A for the third deployment. When the deployment progress becomes 100%, the application distributor 215 may determine that the third deployment of the application update is complete.

Upon the determination that the third deployment is complete and/or the testing for the third deployment is complete, the application distributor 215 may commence a fourth deployment of the application update to the clients 230 of the second release group 210B. In carrying out the fourth deployment of the application update, clients 230 of the first release group 210A may have been provided with a version of the application and/or clients 230 of the second release group 210B may receive a new version of the application from the application distributor 215.

Figure 3E:
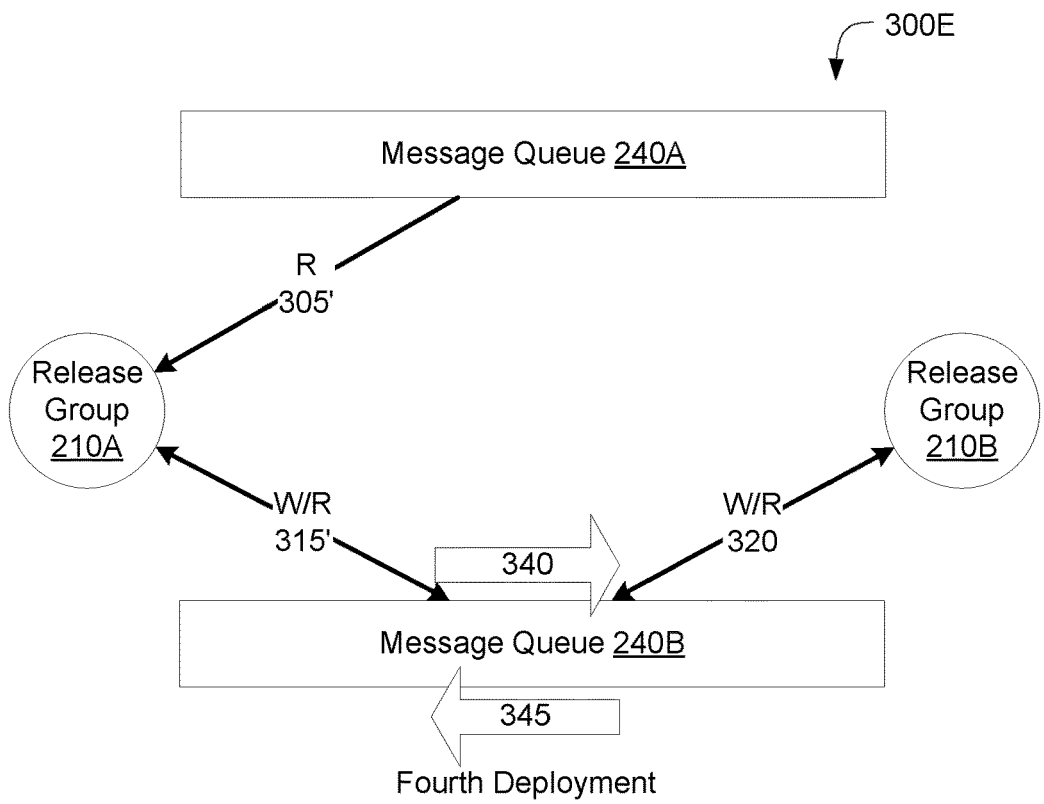

Referring now to the fifth stage 300E as shown in FIG. 3E, with the fourth deployment of the application to the second release group 210B, the queue manager 225 may configure or set the second release group 210B to cease reading from the communication channel of the first message queue 240A. In some embodiments, the queue manager 225 may determine whether all the messages from the first release group 210A stored on the first message queue 240A are read by the clients 230 of the second release group 210B. If all the messages from the first release group 210A are determined to have been read by the second release group 210B, the queue manager 225 may then configure or set the second release group 210B to cease reading from the communication channel of the first message queue 240A. In some embodiments, the queue manager 225 may delete or remove the read channel for the second release group 210B to the first message queue 240A (communication path 310'). The first release group 210A may continue to read from the communication channel of the first message queue 240A (via R path 305'). The first release group 210A may continue to write to and read from the communication channel of the second message queue 240B (via W/R path 315'). The second release group 210A may also continue to write to and read from the communication channel of the second message queue 240B (via W/R path 320). With this configuration, all the new messages from the first release group 210A may flow through the second message queue 240B to the second release group 210B (via communication channel 340. Furthermore, all the new messages from the second release group 210B may continue to flow through the first message queue 210A via communication channel 345.

The instrumentation service 220 may continue to perform the two-sample hypothesis testing on the first release group 210A and the second release group 210B running the respective versions of the application of the fourth deployment. In performing the testing, the instrumentation service 220 may continue to monitor, measure, or receive the runtime data of each client 230 in the first release group 210A and the second release group 210B. The instrumentation service 220 may also determine whether the fourth deployment of the application update is to commence or whether the third deployment has finished. Upon determining that the fourth deployment is to commence or that the third deployment has finished, the instrumentation service 220 may begin writing the runtime data of the version of the application running on the clients 230 of the first release group 210A onto the second data cache 245B. In some embodiments, the instrumentation service 220 may configure or set the first release group 210A to write the runtime data onto the second data cache 245B and to cease writing runtime data onto the first data cache 245A. The clients 230 of the second release group 210B may continue to write runtime data onto the second data cache 245B. As such, all the runtime data on the first data cache 245A may be from prior deployments and all the new runtime data from the first release group 210A and the second release group 210B may be stored on the second data cache 245B.

The application distributor 215 may determine whether the fourth deployment of the application update is complete. In some embodiments, the application distributor 215 may monitor a deployment progress of the fourth deployment of the application update to the second release group 210B. The deployment progress may indicate a percentage of completion of the fourth deployment of the application update to the second release group 210B. In some embodiments, the deployment progress may indicate a percentage of completion of the fourth deployment of the version of the application to the clients 230 of the second release group 210B for the fourth deployment. When the deployment progress becomes 100%, the application distributor 215 may determine that the fourth deployment of the application update is complete.

Upon the determination that the fourth deployment is complete and/or the testing for the fourth deployment is complete, the application distributor 215 may commence a fifth deployment of the application update to the clients 230 of the first release group 210A. In carrying out the fifth deployment of the application update, clients 230 of the first release group 210A may receive a new version of the application and/or clients 230 of the second release group 210B may have been provided with another version of the application from the application distributor 215.

Figure 3F:
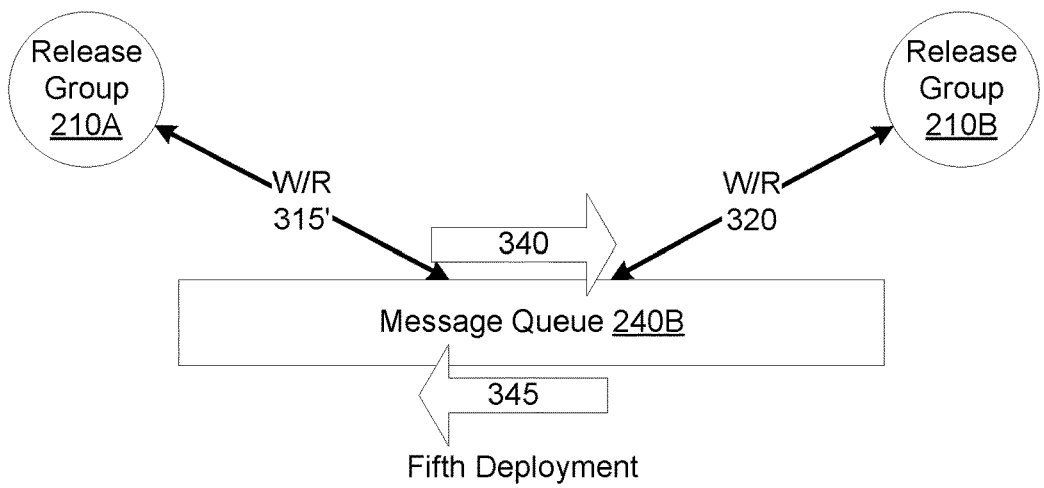

Referring now to the sixth stage 300F as shown in FIG. 3F, with the fifth deployment of the application to the first release group 210A, the queue manager 225 may configure or set the first release group 210A to cease reading from the communication channel of the first message queue 240A. In some embodiments, the queue manager 225 may determine whether all the messages from the second release group 210A stored on the first message queue 240A are read by the clients 230 of the first release group 210B. If all the messages from the second release group 210A are determined to have been read by the first release group 210B, the queue manager 225 may then configure or set the first release group 210B to cease reading from the first message queue 240A. In some embodiments, the queue manager 225 may delete or remove the read channel for the first release group 210A to the first message queue 240A (communication path 305'). The first release group 210A may continue to write to and read from the second message queue 240B (via W/R path 315'). The second release group 210A may also continue to write to and read from the second message queue 240B (via W/R path 320). With this configuration, all the new messages from the first release group 210A may flow through the second message queue 240B to the second release group 210B via communication channel 340). All new messages from the second release group 210B may flow through the first message queue 240A to the first release group 210A via communication channel 345.

With the first message queue 240A no longer read by either the first release group 210A or the second release group 210B, the queue manager 225 may remove or delete the first message queue 240A. In some embodiments, the queue manager 225 may determine whether any of the first release group 210A or the second release group 210B is reading from the first message queue 240. If neither the first release group 210A nor the second release group 210B is determined to be reading from the first message queue 240A, the queue manager 225 may remove or delete the first message queue 240A. In some embodiments, the queue manager 225 may determine whether all the messages from the second release group 210A the first message queue 204A are read by the clients 230 of the first release group 210B. If all the messages from the second release group 210A are determined to have been read by the first release group 210B, the queue manager 225 may then remove or delete the first message queue 240A. Otherwise, the queue manager 225 may determine whether the messages stored on the first message queue 204A are expired. The queue manager 225 may identify a time duration of storage for each message stored first message queue 204A. For each identified time duration of the message, the queue manager 225 may compare the time duration to a predefined expiration time. In some embodiments, the predefined expiration time may be set using the Redis™ EXPIRE command. If the time durations of all the stored messages are greater than the predefined expiration time, the queue manager 225 may determine that the messages stored on the first message queue 240A are expired. Upon determining that the stored messages are all expired, the queue manager 225 may remove or delete the first message queue 240A. In this manner, the queue manager 225 may ensure that the clients 230 of the first release group 210A and the second release group 210B read all the messages from the other release group in the first message queue 240A, prior to migrating or transferring the communication channel to the second message queue 240B.

The instrumentation service 220 may continue to perform the two-sample hypothesis testing on the first release group 210A and the second release group 210B running the respective versions of the application of the fifth deployment. In performing the testing, the instrumentation service 220 may continue to monitor, measure, or receive the runtime data of each client 230 in the first release group 210A and the second release group 210B. The instrumentation service 220 may also determine whether the fifth deployment of the application update is to commence or whether the fourth deployment has finished. Upon determining that the fifth deployment is to commence or that the fourth deployment has finished, the instrumentation service 220 may determine whether any of the first release group 210A or the second release group 210B is writing runtime data onto the first data cache 245A. If neither the first release group 210A nor the second release group 210B is determined to be writing the runtime data onto the first data cache 245A, the instrumentation service 220 may remove or delete the first data cache 245A. In some embodiments, in response to the queue manager 225 deleting the first message queue 240A, the instrumentation service 220 may remove or delete the first data cache 245A and the data store 235A. Any new runtime data from the first release group 210A or the second release group 210B may be written onto the second data cache 245B.

The application distributor 215 may determine whether the fifth deployment of the application update is complete. In some embodiments, the application distributor 215 may monitor a deployment progress of the fifth deployment of the application update to the first release group 210A. The deployment progress may indicate a percentage of completion of the fifth deployment of the application updates to the first release group 210A. In some embodiments, the deployment progress may indicate a percentage of completion of the fifth deployment of the version of the application to the clients 230 of the first release group 210A for the fifth deployment. When the deployment progress becomes 100%, the application distributor 215 may determine that the fifth deployment of the application update is complete.

The above described functionalities of the application distributor 215, the instrumentation service 220, and the queue manager 225 of the deployment instrumentation system 205 may be repeated in environments where there are more than two release groups. In addition, the functionalities of the queue manager 225 may be repeated over multiple message queues 240A-N between three or more release groups.

Figure 4:
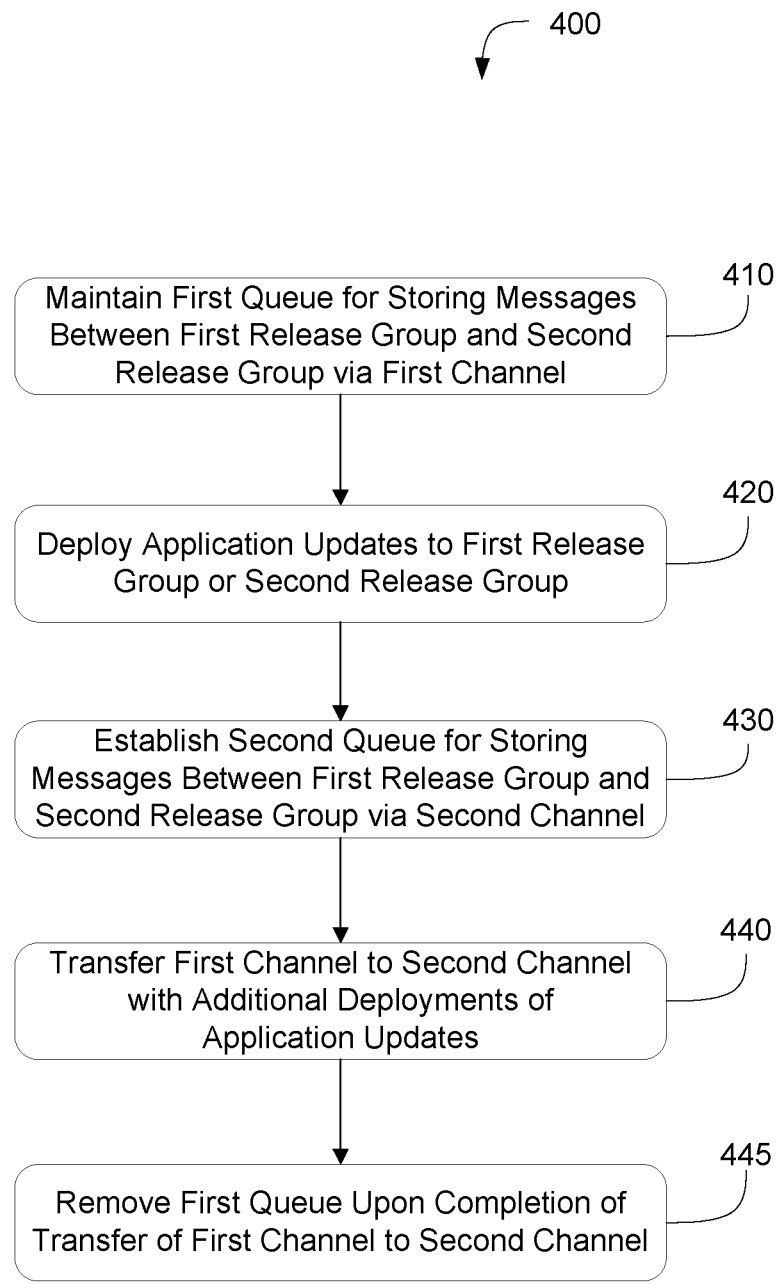
FIG. 4 is a flow diagram of an embodiment of a method for maintaining message queues during deployments of application updates.

Referring now to FIG. 4, depicted is a flow diagram of an embodiment of a method 400 of maintaining message queues during deployments of application updates. The operations and functionalities of the method 400 may be performed by the components described in FIG. 1 and FIG. 2A, the system 200 detailed above. In brief overview, a queue manager may maintain a first message queue for storing messages between a first release group and a second release group via a first communication channel (410). Application updates may be deployed to the first release group or the second release group (420). The queue manager may establish a second message queue for storing messages between the first release group and the second release group via a second communication channel (430). The queue manager may transfer the first communication channel to the second communication channel with additional deployments of application updates (440). The queue manager may remove the first message queue in response to the completion of the transfer of the first communication channel to the second communication channel (445).

In further detail, the queue manager may maintain a first message queue for storing messages between a first release group and a second release group via a first communication channel (410). The queue manager may configure the both the first release group and the second release group to write to and read from the first message queue. The first message queue may include a first write channel for messages to be written by the first release group to be read by the second release group. The first communication channel may include a second write channel for messages to be written by the second release group for the first release group. A communication channel formed through the first message queue may include a first read channel for messages from the first release group to be read by the second release group. Another communication channel formed through the first message queue may include a second read channel for messages from the second release group to be read by the first release group. The messages may include runtime data (e.g., performance-related metrics), commands (e.g., a request to start a task or process), or notifications (e.g., completion of a task or process), among others. The messages may be from the different version of the application running the clients of each release group.

Application updates may be deployed to the first release group or the second release group (420). An application distributor may provide an application update to the first release group and/or the second release group. The application distributor may provide a first version of the application to the first release group and may provide a second version of the application to the second release group. With each deployment of the one or more application updates, the application distributor may determine whether the current deployment has finished. Upon determining that the current deployment has finished, the application distributor may commence with the next deployment of the application update to the first release group and/or the second release group.

The queue manager may establish a second message queue for storing messages between the first release group and the second release group via a second communication channel (430). The second message queue may be established in response to the first deployment of the application update. The second message queue may include a first write channel for messages to be written by the first release group to be read by the second release group. The second message queue may include a second write channel for messages to be written by the second release group for the first release group. A communication channel formed through the second message queue may include a first read channel for messages from the first release group to be read by the second release group. Another communication channel formed through the second message queue may include a second read channel for messages from the second release group to be read by the first release group. The queue manager may initially set the first release group to read from the second message queue. The first release group may continue to write to and read from the first message queue. The second release group may continue to write to and read from the first message queue.

The queue manager may transfer the communication channels of the first message queue to the second message queue with additional deployments of application updates (440).

Initially, both communication channels may be at the first message queue, as messages from the first release group flow to the second release group and messages from the second release group flow to the first release group. With subsequent deployments, the queue manager may configure which message queue the first release group and the second release group writes to and reads from. With the second deployment of the application update, the queue manager may configure the second release group to cease writing to the first message queue and to begin writing to and reading from the second message queue, thereby transferring one communication channel from the first message queue to the second message queue. With the third deployment, the queue manager may configure the first release group to cease writing onto the first message queue and commence writing to the second message queue, resulting in both communication channels being transferred to the second message queue. With the fourth deployment, the queue manager may configure the second release group to cease reading from the first message queue. With the fifth deployment, the queue manager may configure the first release group to cease reading from the first message queue. In this manner, the first communication channel may be transferred from the first message queue to the second message queue.

The queue manager may remove the first message queue in response to the completion of the transfer of the two communication channels (445). The queue manager may determine whether all the messages in the first message queue have been read by the first release group and/or the second release group. If all messages are determined to have been read, the queue manager may delete or remove the first message queue. If all messages are determined to not have been read, the queue manager may determine whether an expiry time on each message has elapsed. When the expiry times for all messages in the first communication channel are determined to have elapsed, the queue manager may remove or delete the first release group.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   maintaining, by one or more processors, a first message queue for reading and writing by each of a first release of an application and a second release of the application one or more messages communicated between the first release and the second release via a first channel;
   establishing, by the one or more processors responsive to an update to one of the first release of the application or the second release of the application, a second message queue for queueing one or more messages communicated between the first release and the second release via a second channel;
   causing, by the one or more processors responsive to the update to one of the first release of the application or the second release of the application, the first channel to use the second message queue instead of the first message queue; and
   causing, by the one or more processors, the first release and second release to cease writing to and reading from the first message queue and to write to and read from the second message queue.

2. The method of claim 1, further comprising deploying, by the one or more processors, the update to one of the first release of the application or the second release of the application.

3. The method of claim 1, further comprising configuring, by the one or more processors responsive to establishing the second message queue, the first release of the application to continue to read and write from the first message queue and read the second message queue via the second channel.

4. The method of claim 1, further comprising configuring, by the one or more processors responsive to establishing the second message queue, the second release of the application to continue to read from and cease writing to the first message queue and to read to and write from the second message queue via the second channel.

5. The method of claim 1, further comprising configuring, by the one or more processors responsive to the first channel using the second message queue, the first release of the application to cease reading to and writing from the first message queue.

6. The method of claim 1, further comprising configuring, by the one or more processors responsive to the first channel using the second message queue, the second release of the application to cease reading from the first message queue.

7. The method of claim 1, further comprising deleting the first message queue responsive to one of the first release of the application and the second release of the application ceasing to read from the first message queue or one or more remaining messages in the first message queue being expired.

8. A system comprising:
one or more processors, coupled to memory and configured to:
maintain a first message queue for reading and writing by each of a first release of an application and a second release of the application one or more messages communicated between the first release and the second release via a first channel;
establish, responsive to an update to one of the first release of the application or the second release of the application, a second message queue for queueing one or more messages communicated between the first release and the second release via a second channel;
causing, responsive to the update to one of the first release of the application or the second release of the application, the first channel to use the second message queue instead of the first message queue; and
causing the first release and second release to cease writing to and reading from the first message queue and to write to and read from the second message queue.

9. The system of claim 8, wherein the one or more processors are further configured to deploy the update to one of the first release of the application or the second release of the application.

10. The system of claim 8, wherein the one or more processors are further configured to configure, responsive to establishing the second message queue, the first release of the application to continue to read and write from the first message queue and read the second message queue via the second channel.

11. The system of claim 8, wherein the one or more processors are further configured to configure, responsive to establishing the second message queue, the second release of the application to continue to read from and cease writing to the first message queue and to read to and write from the second message queue via the second channel.

12. The system of claim 8, wherein the one or more processors are further configured to configure, responsive to the first channel using the second message queue, the first release of the application to cease reading to and writing from the first message queue.

13. The system of claim 8, wherein the one or more processors are further configured to configure, responsive to the first channel using the second message queue, the second release of the application to cease reading from the first message queue.

14. The system of claim 8, wherein the one or more processors are further configured to delete the first message queue responsive to one of the first release of the application and the second release of the application ceasing to read from the first message queue or one or more remaining messages in the first message queue being expired.

15. A non-transitory computer-readable medium comprising instructions that, when executed by one or more processors, cause the one or more processors to:
maintain a first message queue for reading and writing by each of a first release of an application and a second release of the application one or more messages communicated between the first release and the second release via a first channel;
establish, responsive to an update to one of the first release of the application or the second release of the application, a second message queue for queueing one or more messages communicated between the first release and the second release via a second channel;
causing, responsive to the update to one of the first release of the application or the second release of the application, the first channel to use the second message queue instead of the first message queue; and
causing the first release and second release to cease writing to and reading from the first message queue and to write to and read from the second message queue.

16. The non-transitory computer-readable medium of claim 15, further comprising instructions that, when executed by the one or more processors, cause the one or more processors to deploy the update to one of the first release of the application or the second release of the application.

17. The non-transitory computer-readable medium of claim 15, further comprising instructions that, when executed by the one or more processors, cause the one or more processors to configure, responsive to establishing the second message queue, the first release of the application to continue to read and write from the first message queue and read the second message queue via the second channel.

18. The non-transitory computer-readable medium of claim 15, further comprising instructions that, when executed by the one or more processors, cause the one or more processors to configure, responsive to establishing the second message queue, the second release of the application to continue to read from and cease writing to the first message queue and to read to and write from the second message queue via the second channel.

19. The non-transitory computer-readable medium of claim 15, further comprising instructions that, when executed by the one or more processors, cause the one or more processors to configure, responsive to the first channel using the second message queue, the first release of the application to cease reading to and writing from the first message queue.

20. The non-transitory computer-readable medium of claim 15, further comprising instructions that, when executed by the one or more processors, cause the one or more processors to configure, responsive to the first channel using the second message queue, the second release of the application to cease reading from the first message queue.

* * * * *